Patented Apr. 2, 1940

2,195,396

UNITED STATES PATENT OFFICE 2,195,396

PROCESS OF PURIFYING CELLULOSE MATERIALS

Nils W. Coster, Everett, Wash., assignor to Soundview Pulp Company, Everett, Wash., a corporation of Washington No Drawing. Application October 22, 1937
Serial No. 170,447

3 Claims. (Cl. 8—105)

This invention relates to the purification of cellulose materials and it has reference more particularly to a process for treating wood pulp for the removal of impurities such as lignin, fats and resins; the invention having for its principal objects the provision of an improved process whereby a fully purified material may be produced in an easy and comparatively inexpensive manner with minimum fibre loss and with a lesser amount of reaction agent than is required by methods generally employed heretofore.

Explanatory to the present invention, it will be here stated that ordinarily, in a multi-stage process for the purification of a cellulose material, the preliminary treatment involves the using of either elemental chlorine or hypochlorite solutions. There are certain objectionable features in the use of either of these methods, such as the obtaining of too highly acidified solutions when the treatment is by chlorine gas and a retardment in reaction speed prevails when using hypochlorite solutions.

However, I have discovered that by combining these two treatments a reaction will take place that is equally fast as the chlorine treatment and in addition produces a fully purified product; the highly acidified solutions are avoided, yet the acid solution, or suspension, is sufficiently acid to prevent the retardment in reaction speed which prevails when using only the hypochlorite solutions.

In accordance with the present invention, the treatment is as follows:

First, the cellulose material to be treated is reduced to such condition or state that it can be agitated or circulated in the vat, and to it is added a designated amount of chlorine gas. Following the absorption of the gas by the cellulose material, the hypochlorite solution is added at such a rate that at no time will there be any hypochlorite present by reason of its being instantly converted into hypochlorous acid, which, in its state of liberation becomes the purifying reagent. Therefore it is necessary that the acidity of the cellulose suspension be so controlled from the time of adding the hypochlorite solution to the completion of the preliminary purification that nothing but hypochlorous acid in its state of liberation is used to dissolve the impurities in the cellulose material.

The amount of chlorine gas and hypochlorite solution used in a treatment will vary in accordance with the extent of impurities in the material to be purified and with the degree of purification desired. However, at no time should it be so great that any appreciable oxidation or bleaching would take place; the sole purifying reaction being that of hypochlorous acid in its state of liberation dissolving the impurities in the cellulose material without any chemical attack on the cellulose fibre. Furthermore, the ratio between available chlorine as chlorine gas and as hypochlorite, and the rate of flow by which the hypochlorite is added to the cellulose material, must at all times be such that nothing but the before-mentioned hypochlorous acid, in its state of liberation, can be formed and allowed to act as a dissolving reagent.

It is the intent in practising the present invention, to use such an amount of chlorine gas and hypochlorite solution that when the available chlorine, or hypochlorous acid, in its state of liberation, is exhausted, the cellulose material will have attained an orange color; the cellulose fibre itself remaining unbleached. In fact, the cellulose fibre, after it has been alkalized and washed, is darker than in its unbleached state.

The alkalizing of the material can be done either before or after washing, but for best results it is necessary to first wash the orange colored cellulose material, then alkalize and follow this by another washing. This procedure will result in the following: Those impurities that are soluble in acid solutions are removed first, then by alkalizing, and repeated washing, the impurities soluble in alkaline solutions are removed, thus lessening the load on the final purification or bleaching.

The final purification or bleaching of this material may be either in one or two stages, as found necessary, using either high or low density, or both, but care should be taken at all times that the cellulose material is always sufficiently alkaline to prevent serious destruction of its molecular structure.

Thus, in the preliminary treatment, by combining the use of elemental chlorine with the treatment by hypochlorite solutions, a reaction is caused to take place which has been found very desirable and advantageous from the standpoint that it provides a fully purified product, with a minimum fibre loss and without retardation in reaction speed; this being especially useful in the purification of wood pulp, although not limited thereto.

Having thus described my invention, what I claim as new therein and desire to secure by Letters Patent is:

1. The process of purifying cellulose material which comprises preparing the material for a condition of suspension, circulation or agitation in a vat, adding thereto an amount of chlorine gas, and after absorption of the gas by the material, adding a hypochlorite solution at such rate as to be instantly converted into hypochlorous acid, which, in its state of liberation, operates to dissolve the impurities in the material; the amount of chlorine gas and the hypochlorite solution being such that when the available chlorine gas, hypochlorous acid in its state of liberation, is exhausted, the cellulose material will have an orange color.

2. The process of purifying cellulose material which comprises preparing the material for a condition of suspension, circulation or agitation in a vat, adding thereto an amount of chlorine gas, and after absorption of the gas by the material, adding a hypochlorite solution at such rate as to be instantly converted into hypochlorous acid, which, in its state of liberation, operates to dissolve the impurities in the material; the amount of chlorine gas and the hypochlorite solution being such that when the available chlorine gas, hypochlorous acid in its state of liberation, is exhausted, the cellulose material will have an orange color; then washing the orange colored cellulose material, then alkalizing and again washing.

3. The process of purifying cellulose material to its pure orange color, prior to bleaching to a pure white color, which comprises preparing the material for a condition of suspension, circulation or agitation in a vat, adding thereto an amount of chlorine gas, and after absorption of the gas by the material, adding a hypochlorite solution at such a rate as to be instantly converted into hypochlorous acid, which, in its state of liberation, operates to dissolve the impurities in the material; the amount of chlorine gas and the hypochlorite solution being such that when the available chlorine gas and hypochlorous acid in its state of liberation is exhausted, the cellulose material will have its pure orange color, then washing to effect the removal of the acid soluble impurities, then alkalizing the material in an alkaline solution and again washing to effect the removal of the alkaline soluble impurities.

NILS W. COSTER.